US011336219B2

United States Patent
Stanek et al.

(10) Patent No.: US 11,336,219 B2
(45) Date of Patent: May 17, 2022

(54) MONITORING AN ELECTRICAL MACHINE FOR THE PRESENCE OF A FAULT

(71) Applicants: Christian Stanek, Marquartstein (DE); Johannes Heissenberger, Taufkirchen (DE); Dieter Cramer, Munich (DE)

(72) Inventors: Christian Stanek, Marquartstein (DE); Johannes Heissenberger, Taufkirchen (DE); Dieter Cramer, Munich (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 19 days.

(21) Appl. No.: 16/919,719

(22) Filed: Jul. 2, 2020

(65) Prior Publication Data

US 2021/0006196 A1 Jan. 7, 2021

(30) Foreign Application Priority Data

Jul. 3, 2019 (DE) .......................... 102019209769.3

(51) Int. Cl.
*H02P 29/024* (2016.01)
*H02K 11/27* (2016.01)
(Continued)

(52) U.S. Cl.
CPC .......... *H02P 29/0243* (2016.02); *H02K 11/27* (2016.01); *H02P 29/027* (2013.01);
(Continued)

(58) Field of Classification Search
CPC .... H02P 29/0243; H02P 29/027; H02K 11/27
(Continued)

(56) References Cited

U.S. PATENT DOCUMENTS 5,574,346 A * 11/1996 Chavan .................. G01R 31/34
318/434
8,598,837 B2 * 12/2013 Kitanaka .............. H02H 7/0838
318/801
(Continued)

FOREIGN PATENT DOCUMENTS

DE          69721455 T2    4/2004
DE       102014215130 A1   2/2015

OTHER PUBLICATIONS

German Search Report for German Application No. 10 2019 209 769.3 dated Mar. 30, 2020.

*Primary Examiner* — David Luo
(74) *Attorney, Agent, or Firm* — Lempia Summerfeld Katz LLC (57) ABSTRACT

The disclosure relates to an electric machine and in particular to the monitoring of the electric machine for the presence of a fault, (e.g., in the stator windings). A monitoring unit is provided, wherein the monitoring unit measures the multi-phase electrical time signals transmitted from or to the machine and with the aid of a Hilbert filter determines substantially in real time the envelopes and the phase positions of the individual phases of the time signal. The envelopes corresponding to the different phases or the corresponding phase positions are compared with one another by way of forming differences and, in the event that one or more of the differences deviate(s) from a specified expectation value, the presence of a fault is inferred. The approach allows significantly increased operational reliability of the electric machine to be achieved in particular.

16 Claims, 3 Drawing Sheets

(51) Int. Cl.
  *H02P 101/45*     (2016.01)
  *H02P 101/30*     (2015.01)
  *H02P 101/35*     (2016.01)
  *H02P 101/40*     (2015.01)

(52) U.S. Cl.
  CPC ...... *H02K 2213/03* (2013.01); *H02P 2101/30* (2015.01); *H02P 2101/35* (2015.01); *H02P 2101/40* (2015.01); *H02P 2101/45* (2015.01)

(58) Field of Classification Search
  USPC .................................................. 318/490, 34
  See application file for complete search history.

(56)          References Cited

U.S. PATENT DOCUMENTS 10,162,009 B2 *  12/2018  Schmaus ................ G01R 31/34
  2016/0178699 A1   6/2016  Schmaus et al.

* cited by examiner

MONITORING AN ELECTRICAL MACHINE FOR THE PRESENCE OF A FAULT

The present patent document claims the benefit of German Patent Application No. 10 2019 209 769.3, filed Jul. 3, 2019, which is hereby incorporated by reference.

TECHNICAL FIELD

The disclosure relates to an electric machine of an electrical system and in particular to the monitoring of the system and the electric machine for the presence of a fault, for example, in the stator winding system of a stator of the machine.

BACKGROUND

The electrical system may be a drive system of an electrically driven vehicle, such as an aerial, land, or water vehicle. However, these embodiments are to be understood as nothing more than examples, because the electrical system does not necessarily have to be confined to such mobile applications, even if in the text which follows such applications are taken as a basis by way of example. The electrical system may also be a transformer or the like, which is used, for example, in a safety-critical system, such as an electrical transportation system or device, a power generating plant, or in an electricity grid.

For mobile applications, for example, for driving aerial vehicles such as aircraft or helicopters, but also for electrically driven land or water vehicles, etc., concepts based on electric drive systems are being investigated and used as an alternative to the customary internal combustion engines. Such an electric drive system, which may be formed as a purely electric drive system or else as a hybrid electric drive system, may have at least one electric machine that is operated as an electric motor for driving the propulsion of the aerial vehicle. Also provided are a corresponding source of electrical energy for supplying the electric motor and also, e.g., a power electronics system, and of course the corresponding cabling for the electrical connection of these components of the drive system, with the aid of which the electric motor is operated. Also provided in the case of a hybrid electric drive system is an internal combustion engine, which is integrated in the drive system in series or in parallel with the electric machine and for example drives a generator, which for its part makes electrical energy available, which may be stored in a battery and/or fed to the electric motor.

During the electrical operation of such an electrical system in an aerial vehicle, a fault in the electric drive system may have serious consequences and, in no doubt the worst case, cause the aerial vehicle to crash. This is accompanied by corresponding risks for passengers and may involve considerable material damage. In the case of the hybrid electric drive system, a fault may occur in any of the components of the drive system enumerated by way of example at the beginning. This includes the energy store that delivers the electrical energy for supplying the electric motor, the power electronics system of the electric motor, (e.g., which converts a direct current into an alternating current for the electric motor), the electric motor itself, the generator, and/or, a power electronics system assigned to the generator.

Faults in other applications of such an electrical system, (e.g., in the applications mentioned at the beginning), have possibly less serious consequences for passengers or other users of the respective system, but nevertheless likewise may involve at least material damage, or at least cost-incurring failures or the like.

In any event, current or voltage signals that vary in amplitude, frequency, and phase are transmitted in such an electrical system between components of the system, for example, between a power electronics system and the electric machine electrically connected to it.

In order in particular to monitor the functional capability or the reliable operation of the electric machine, and consequently possibly of the drive system, currents or voltages are measured. Possible faults or defects, (e.g., ruptures or damage to the insulation of the stator windings or of the coils forming the stator windings), may be inferred from an analysis of the measured values. However, these analyses may only be performed "off-line", e.g., only after the event or with a time delay.

The analyses use mathematical methods, such as short-term Fourier transformation ("short-term FFT") or wavelet transformation. These methods are complex in the parameterization for producing suitable results, which results in a laborious procedure for choosing parameters, and are therefore not suitable for real-time applications. Furthermore, they require extremely powerful and storage-intensive computer architectures. The net result is that these approaches are not suitable for the applications in question here of monitoring the operation of the electric machine, and consequently the reliability of the drive system.

SUMMARY AND DESCRIPTION

It is therefore an object of the present disclosure to provide a way of creating an electrical system with increased operational reliability.

This object is achieved by the method, the monitoring unit, and the electrical system described herein. The scope of the present disclosure is defined solely by the appended claims and is not affected to any degree by the statements within this summary. The present embodiments may obviate one or more of the drawbacks or limitations in the related art.

The method describes the operation of an electric machine of an electrical system in dependence on an operating state of the electrical system, it being intended for example that the presence of a fault in a winding system of a stator of the electric machine may have an influence on the operating state.

During the operation of the electric machine, at least one group of evaluation variables (but possibly also a plurality of such groups) is/are determined with the aid of a monitoring unit for a multiphase electrical time signal, (e.g., including multiple phases). The evaluation variable(s) is/are transmitted momentarily between a power electronics system and the electric machine, or from or to the electric machine, in such a way that in each case one of the evaluation variables of the group is determined for at least two of the different phases of the multiphase time signal.

In an evaluation circuit, each of the determined evaluation variables of the respective group that were determined for the different phases of the multiphase time signal is compared with every other of the determined evaluation variables of this group. In a respective comparison, an associated relationship of the evaluation variables respectively to be compared is determined, and then represents a respective result of the comparison. In this case, the term "relationship" may expressly include not only a quotient of the evaluation variables to be compared but also, for example, as an alternative to this, the corresponding difference between the evaluation variables to be compared.

The operating state of the electrical system is established in dependence on the results of the comparison, in particular, as a normal operating state, as a warning operating state, or as an alarm operating state. Such a "result of the comparison" is of course the result obtained in the respective comparison of the evaluation variables, for example, the difference of the evaluation variables to be compared or the corresponding quotient.

For the sake of clarity, the expression "phase of the time signal" means a dedicated time signal in each case. The multiphase time signal may be made up of three time signals, which are phase-offset with respect to one another. These time signals that are phase-offset with respect to one another are the "phases of the time signal". The electrical time signal may be the current or else the voltage.

Here, an electrical "time signal" is understood in principle as meaning a time-dependent electrical signal, for example, a current or a voltage. The time dependence manifests itself, for example, in the fact that the signal amplitude may be different at different points in time.

In the event that the results of the comparison lie within a first tolerance range dT1 around an expectation value EW for these results of the comparison, the electrical system is operated in a normal operating state.

In the event that at least one of the results of the comparison lies within a second tolerance range dT2 around the expectation value EW for this result of the comparison, the electrical system is operated in a warning operating state. In the warning operating state of the electrical system, a closed-loop control of the electric machine, which has in particular an effect on the evaluation variables to be compared, is prompted such that the result of the comparison that at the beginning of the control still lies in the second tolerance range dT2 is changed on account of the control to the extent that it goes into the first tolerance range dT1.

In the event that at least one of the results of the comparison lies within a third tolerance range dT3 around the expectation value EW for this result of the comparison, the electrical system is operated in an alarm operating state. In the alarm operating state of the electrical system, the presence of a fault in at least one of the winding systems of the electric machine is inferred, with either the electrical system, the electric machine, or else only that component of the electrical system in which the fault is present being deactivated in the alarm operating state. This faulty component, for example, of one of the winding systems of the electric machine, may be easily identified on the basis of the results of the comparison. This is explained in more detail in the description of the figures.

In this case, the second tolerance range dT2 is wider than the first tolerance range dT1 and the third tolerance range dT3 is wider than the second tolerance range dT2. Further, the tolerance ranges dT1, dT2, and dT3 are not overlapping.

The various operating modes therefore allow an adequate reaction to the detection of deviations in the evaluation variables, so that the system may be operated sufficiently reliably. A suitable choice of the tolerance ranges dT1, dT2 consequently has in this case an influence on the degree of reliability.

Advantageously, for each phase of the multiphase time signal, a Hilbert filter is applied to the respective phase of the time signal to determine the respective evaluation variable. In the event that the evaluation variable is intended for example to be the envelope of the respective phase of the time signal, as an alternative to the application of the Hilbert filter the respective phase of the time signal may be squared. The use of the Hilbert filter promises significant improvements in the analysis mentioned at the beginning of the measured values or "evaluation variables", from which a possibly existing fault is to be inferred. In particular, the analysis with the aid of the Hilbert filter may be performed substantially in real time, so that the reliability of the overall system is significantly improved, because it is possible to react very quickly to a fault.

In the comparison of the evaluation variables of the different phases of the multiphase time signal with one another, the respective result of the comparison for a respective group is determined by forming a difference or by forming a quotient of the two evaluation variables of the respective group that are in each case to be compared. Before the determination of the differences or the quotients, the evaluation variables may possibly also be filtered with a bandpass filter, the bandpass filter taking into account in particular a momentary speed band or a momentary speed range of the electric machine or the corresponding frequencies, because this frequency is directly reflected in the time signal. For example, the mid-frequency of the bandpass filter may correspond to the frequency of the machine.

In a first embodiment, the envelopes of the different phases of the time signal, which may be determined by the application of the Hilbert filter, are used in one of the groups of evaluation variables as evaluation variables of this group. The envelopes therefore represent substantially the amplitudes of the phases of the time signal.

For this group, for the expectation value EW=EWI, in the event that the results of the comparison are determined by forming a difference, EWI=0 applies. In the event that the results of the comparison are determined by forming a quotient, EWI=1 applies.

The evaluation circuit may be deactivated if a specific parameter based on at least one of the envelopes determined lies below a specified threshold value SWAkt. The specified parameter may be a maximum of one of the envelopes, a mean value of the amounts of the envelopes, or the like. The threshold value SWAkt is accordingly chosen such that it may be assumed that signals which have a sufficient signal-to-noise ratio are fed to the evaluation circuit. In this way, it is possible to rule out to the greatest extent the possibility of going over inadvertently into the controlling state or into the alarm operating state.

In a further embodiment, which may be used as an alternative or in addition to the first embodiment, the phase positions of the different phases of the time signal are used in one of the groups of evaluation variables as evaluation variables of this group.

For this group, for the expectation value EW=EWP, in the event that the results of the comparison are determined by forming a difference, EWP=360°/n applies, where n indicates the number of phases. In the event that the results of the comparison are determined by forming a quotient, EWP=1 applies.

A monitoring unit for performing this method has an electrical interface for connecting the monitoring unit to an electrical line, which carries the multiphase electrical time signal that is transmitted momentarily from or to the electric machine. Also provided is a filter, which may be connected to the electrical line by way of the electrical interface, the filter being designed to determine the evaluation variables from the multiphase electrical time signal fed to the filter from the electrical line by way of the electrical interface. The already mentioned evaluation circuit, which is likewise part of the monitoring unit, is connected to the filter, so that the evaluation variables determined by the filter may be fed to the evaluation circuit. The filter is designed to determine during the operation of the electric machine at least one group of evaluation variables for the multiphase electrical time signal that is transmitted momentarily from or to the electric machine and is fed to the filter by way of the electrical interface, in such a way that in each case one of the evaluation variables (IiDH(t), PIi) of the group is determined for at least two of the different phases of the multiphase time signal. The evaluation circuit is for its part designed to compare each of the determined evaluation variables of the respective group that were determined for the different phases of the multiphase time signal with every other of the determined evaluation variables of this group and, in dependence on a respective result of the comparison, to produce a control signal KS, which serves as a basis for establishing the operating state of the electrical system.

The filter is formed as a Hilbert filter, which performs a Hilbert transformation of the incoming multiphase time signal, and thereby determines the envelopes and/or the phase positions of the phases of the time signal. Consequently, as already mentioned above, advantageously possible inter alia is an analysis of the evaluation variables in real time, so that a greater reliability of the system is achieved.

In the first embodiment, the envelopes of the different phases of the time signal are used in one of the groups of evaluation variables as evaluation variables of this group. The evaluation circuit has in this case an amplitude computing unit, to which this group of envelopes is fed as a group of evaluation variables and which is designed to determine in the comparison of the evaluation variables of this group with one another a respective difference between or a quotient of two evaluation variables of the group that are to be compared.

In the further embodiment, which may be used in addition or as an alternative to the first embodiment, the phase positions of the different phases of the time signal are used in one of the groups of evaluation variables as evaluation variables of this group. In this case, the evaluation circuit has a phase computing unit, to which this group of phase positions is fed as a group of evaluation variables and which is designed to determine in the comparison of the evaluation variables of this group with one another a respective difference between or a quotient of two evaluation variables of the group that are to be compared.

Finally, the evaluation circuit has an evaluation unit, to which the differences determined in the respective computing unit are fed and which is designed to infer the presence of the fault in the case where at least one of the fed differences deviates significantly from the specified expectation value. The results of the comparison or differences determined in the respective computing unit are fed to the evaluation unit and are compared there with a respective specified expectation value. The evaluation unit then generates the control signal KS in dependence on deviations of the results of the comparison from the respective expectation value.

Consequently, in the presence of the fault, and possibly with the precondition that the evaluation circuit is not deactivated, a corresponding alarm signal is fed to a control system.

The electrical system that is being monitored in such a way has an electric machine, which may be formed as an electric motor, as an electric generator, or as a transformer. The monitoring unit is designed for monitoring the electric machine for the presence of a fault in a winding system of the electric machine and is integrated in the electrical system. The system for its part may be a drive system of an aerial, water, or land vehicle.

The solution explained is based on the concept that current/voltage data include information on n measuring channels, the amplitude, phase, and frequency of which is in each case a function of time. In this case, n measuring channels for n phases may be assumed. For each subset of the n measuring channels, there is a mathematical relationship which is intended to be maintained in steady-state or quasi steady-state operation of the fault-free electric machine. For example, the amplitude and frequency of different measuring channels at one point in time may be the same and the phase angle between the signals of two measuring channels may be 120° when n=3. The concept followed here makes use of a mathematical method which does not have to be parameterized and which extracts the amplitude, phase, and frequency of an electrical time signal I(t) or U(t) on the basis of comparatively simple mathematical operations in the form of analytical functions from large amounts of data that occur at high sampling frequencies. This makes possible in effect an in-situ monitoring suitable for real-time applications of an electrical system or an electric machine of such a system, (e.g., a drive system), and thereby achieves a significant improvement in the operational reliability of the system. In other words, the electric machine, (e.g., on board an aerial vehicle), may be monitored virtually in real time for the presence of a fault. A "fault" is very much intended here to include the meaning that the machine does not yet fail entirely, but that, for example, a part-coil rupture or damage to the insulation of a winding system of the machine only gradually becomes noticeable. It would be possible for this to be detected, so that corresponding measures may be taken, possibly at an early time.

Further advantages and embodiments may be found in the drawings and the corresponding description.

BRIEF DESCRIPTION OF THE DRAWINGS

In the text which follows, the disclosure and exemplary embodiments are explained in more detail with reference to drawings. There, the same components are identified by the same designations in various figures. It is therefore possible that, when a second figure is being described, no detailed explanations will be given of a specific designation that has already been explained in relation to another, first figure. In such a case, it may be assumed for the embodiment of the second figure that, even without detailed explanation in relation to the second figure, the component identified there by this designation has the same properties and functionalities as explained in relation to the first figure. Furthermore, for the sake of clarity, in some cases not all the designations are shown in all of the figures, but only those to which reference is made in the description of the respective figure.

In the drawings.

DETAILED DESCRIPTION

Figure 1:
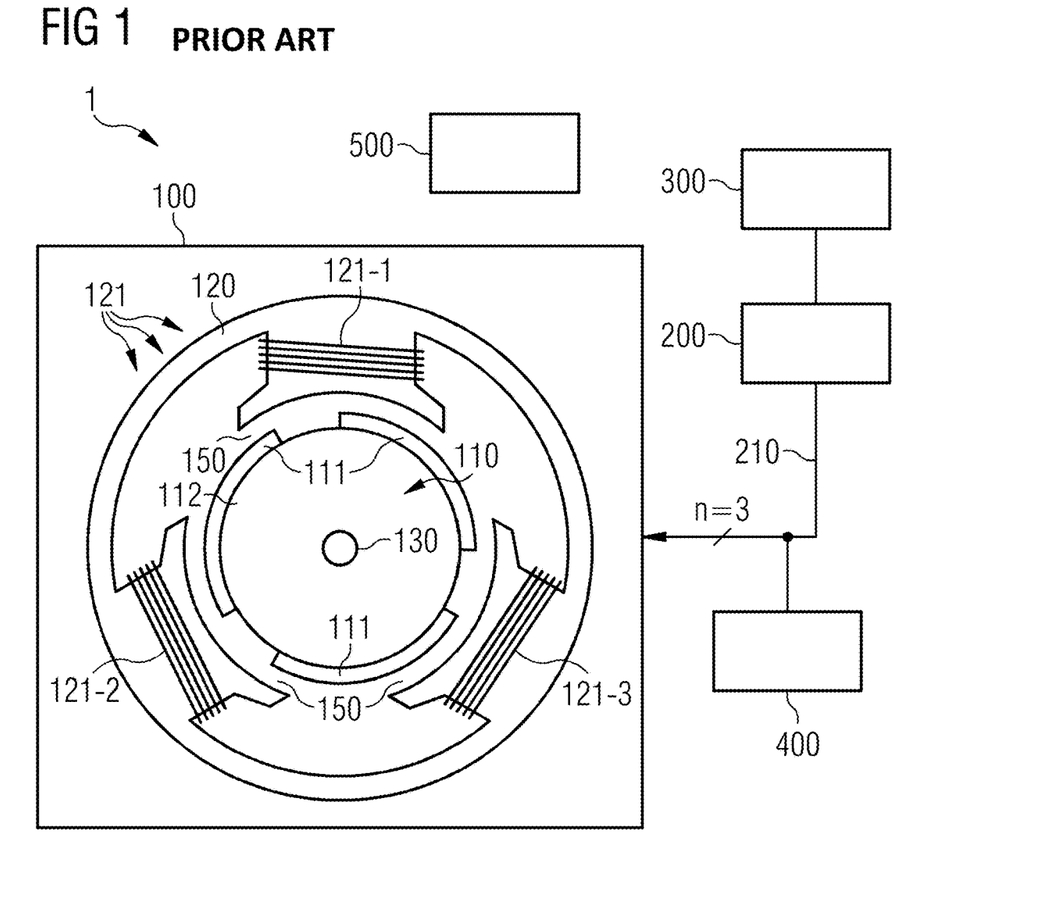
FIG. 1 shows a known electric machine.

FIG. 1 shows in a greatly simplified form a system 1, for example, a drive system of an electric aircraft, with an electric machine 100 formed by way of example as an electric motor, as is known in the prior art. The electric machine 100, in a similar construction, may also be operated as a generator. Furthermore, it should be emphasized that the construction of the machine 100 described in the text which follows is greatly simplified and serves only to illustrate the fundamental functional mode of the electric motor or the electric machine. It may be assumed to be known that the various components of the machine 100 may be arranged differently, depending on whether the electric machine 100 is formed as a generator or as an electric motor and/or as, for example, a radial-flow or axial-flow machine with a rotor formed as an internal or external rotor, etc.

The electric motor 100 has a substantially annular stator 120 and a substantially cylindrical rotor 110, formed here as an internal rotor, the rotor 110 being arranged within the stator 120 and, in the operating state of the electric motor 100, rotating about an axis of rotation. The rotor 110, or its substantially cylindrical rotor main body 112, is connected to a shaft 130 for conjoint rotation, so that rotation of the rotor 110 may be transmitted via the shaft 130 to a component to be driven (not shown), for example, to a propeller of an aircraft.

The stator 120 has a first magnetic device or system 121, which may be realized as a stator winding system 121. This may include multiple winding systems 121-1, 121-2, 121-3. Each of the winding systems 121-1, 121-2, 121-3 may for its part have multiple part-coils 121', as indicated by way of example in FIG. 2. The conductors forming the part-coils 121' have in each case been wound onto a stator tooth 122 of the stator 120 and, in the operating state of the electric motor 100, are flowed through by an electric current, so that magnetic fields are generated. The rotor 110 has second magnetic means 111, which may be formed as permanent magnets 111 and may be arranged on a surface of the rotor main body 112 facing the stator 120.

The first and the second magnetic device or system 121, 111 are formed and arranged in relation to one another so as to be spaced apart from one another by an air gap 150 in such a manner that, in the operating state of the electric motor 100, they interact electromagnetically with one another. This concept, including the conditions for the formation and precise arrangement of the magnetic devices or systems 111, 121 or of the rotor 110 and stator 120, are known per se and are therefore not explained in more detail in the text which follows. To operate the electric machine 100 as an electric motor, by using a current source 200, 300, an electric current is applied to the stator winding system 121 and has the effect that the winding systems 121-1, 121-2, 121-3 generate corresponding magnetic fields, which come to interact electromagnetically with the magnetic fields of the permanent magnets 111 of the rotor 110. This results in a torque acting on the permanent magnets 111 in a first tangential direction T, which, provided that the permanent magnets 111 are connected sufficiently firmly to the rotor main body 112, results in the rotor 110, and with it the shaft 130, being set in rotation when the components are suitably formed and arranged in relation to one another. The current source 200, 300 includes an electrical energy source 300, (e.g., a battery or an electric generator), and a power electronics system 200, which converts the electrical energy provided by the energy source 300 into the current/voltage signal momentarily required by the electric motor 100 for delivering the power requested for example by an operator of the system 1.

Depending on the application of the system 1, the operator of the system 1 may be a pilot or a driver. Depending on the degree of automation, the operator may however also be a control system, an open-loop control system, and/or a closed-loop control system of the system.

By way of example, the electric motor 100 is formed as a three-phase electric machine 100, (n=3), and for this reason is shown by way of example with three permanent magnets 111 and also three winding systems 121-1, 121-2, 121-3. It is known that it is however conceivable for it to take different forms. The current source 200, 300, and in this case in particular its power electronics system 200, is for this purpose configured in such a way that it provides a current signal including three phases $I1(t)$, $I2(t)$, $I3(t)$, accompanied by a three-phase voltage signal $U1(t)$, $U2(t)$, $U3(t)$, a phase $I1(t)$ or $U1(t)$, $I2(t)$ or $U2(t)$ and $I3(t)$ or $U3(t)$ being respectively fed to one of the winding systems 121-1, 121-2 and 121-3.

This concept of forming the multiphase electric machine 100 as an electric motor may be assumed to be known. The corresponding configuration and use of the electric machine 100 as a generator may also be assumed to be known. In this operating mode, the component 300 in FIG. 1 may be understood as a consumer. A current/voltage signal delivered by the generator 100 is converted by the power electronics system 200 into a current/voltage signal that may be processed by the consumer. Further explanations of the electric machine appear to be superfluous at this point, because the disclosure does not so much address the machine itself but rather a monitoring unit 400 for monitoring the reliable operation of the machine.

The monitoring unit 400 is explained in more detail in the text which follows. The monitoring unit 400 is connected by the electrical connection 210 between the power electronics system 200 and the motor 100, so that the monitoring unit 400 may measure the electrical signals I(t), U(t) mentioned above and transmitted via this connection 210.

The components 100, 200, 300, 400 represented in FIG. 1 and any communication etc. between them is/are monitored or controlled in a closed-loop or open-loop manner with the aid of a control system 500.

Figure 2:
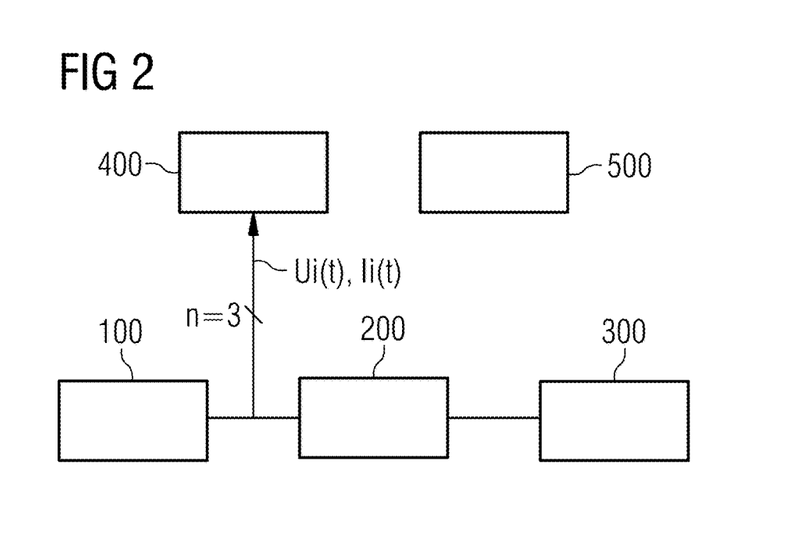
FIG. 2 shows a schematic representation of an example of a drive system.

FIG. 2 shows in a schematic representation the electrical system 1 already represented in FIG. 1, including the electric machine 100, the power electronics system 200, and the component 300, which as described, depending on the operating mode of the electric machine 100 as an electric motor or as a generator, is an electrical energy source or an electrical consumer. In the text which follows, the component 300 does not play a key role.

It may thus be established in real time whether there is a fault in one of the (e.g., n=3) winding systems 121-1, 121-2, 121-3 of the electric machine, for example, a part-coil rupture or damage to the insulation. As already indicated, the stator winding system 121 may be realized as a parallel connection of phase coils or part-coils 121'. This is sketched schematically and by way of example in FIG. 3. The winding systems 121-1, 121-2, 121-3 depicted there respectively include a multiplicity of part-coils 121', which may be interconnected in the way depicted. In this case, for the sake of clarity, it is only for the winding system 121-1 that all of the part-coils 121' are provided with designations. For the two other winding systems 121-2, 121-3, only a few, randomly selected part-coils 121' are in each case identified by designations.

Figure 3:
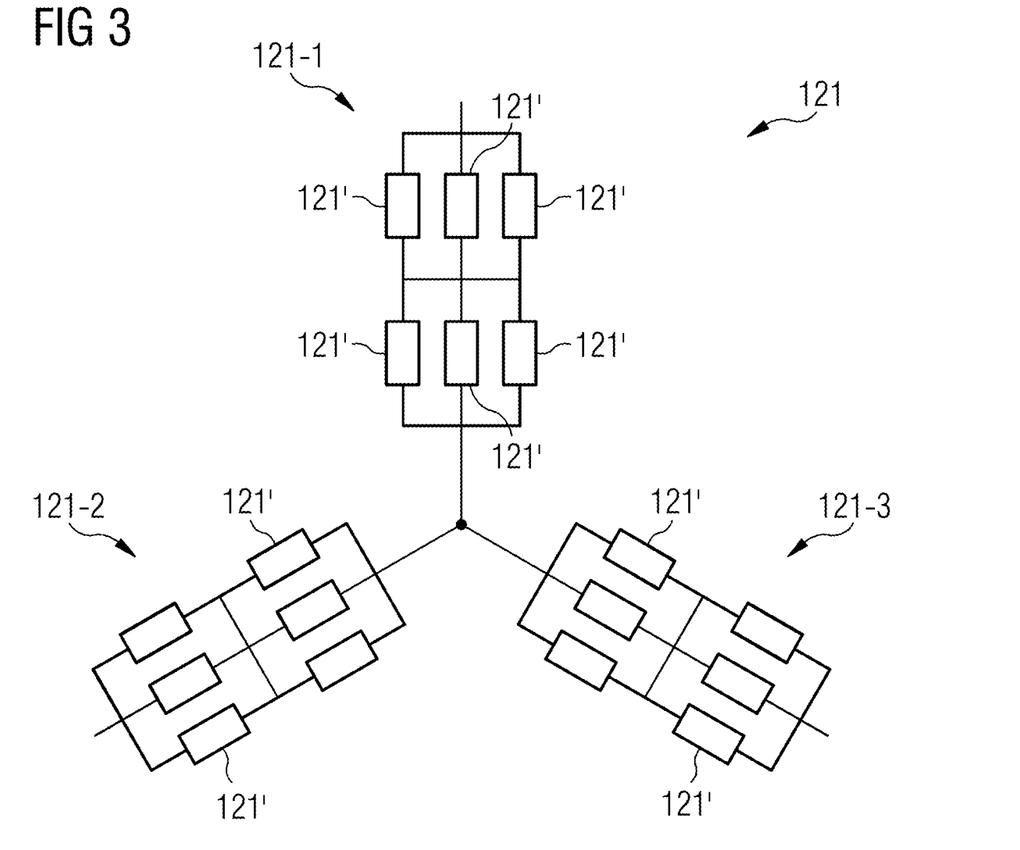
FIG. 3 shows a schematic representation of an example of a stator winding system.

In the event that for example a part-coil contact ruptures, the inductance of the corresponding winding system 121-1, 121-2, 121-3 changes by a percentage that is sufficiently high to make detection of this fault possible.

As explained at the beginning, a fault represents a risk to the electrical system 1. The system 1 is therefore intended to be monitored continuously and in real time with the aid of the monitoring unit 400. Depending on the result of the monitoring, an operating state of the electrical system 1 is established, (e.g., a normal operating state, a warning operating state, or an alarm operating state), and the electric machine 100 is operated in dependence on the momentarily established operating state of the system 1.

For the purpose of monitoring, the system 1 in FIG. 2 has the monitoring unit 400, which measures the phases $I1(t)$, $I2(t)$, ..., $In(t)$ of the current signals $I(t)$ or the phases $U1(t)$, $U2(t)$, ..., $Un(t)$ of the voltage signals $U(t)$ of the power electronics system 200. In this case, as already indicated above, n=3 may apply for example. The monitoring unit 400 is shown here separately from the power electronics system 200, but may well be integrated in the power electronics system 200. For example, the current/voltage measurement of the power electronics system 200 itself may also be used.

Figure 4:
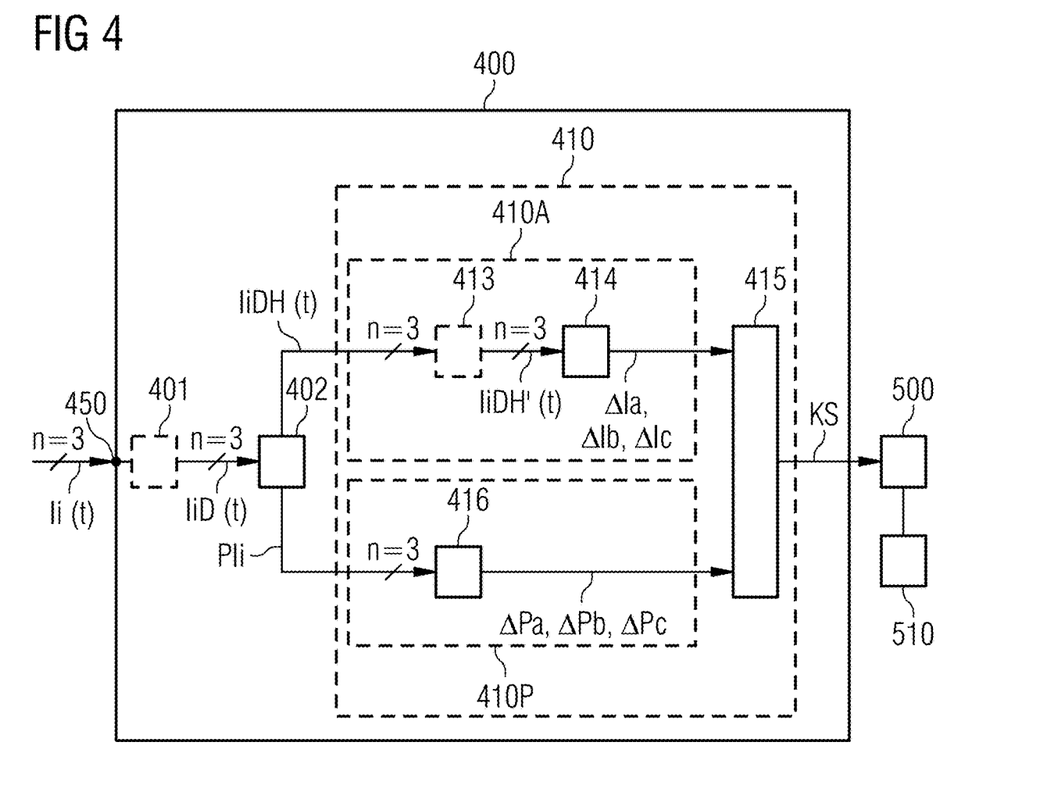
FIG. 4 shows an example of a monitoring unit of the drive system.

Details of the monitoring unit 400 are shown in FIG. 4. In the monitoring unit 400, the signals $Ui(t)$ or $Ii(t)$ arriving or measured there are processed with i=1, ..., n, corresponding to the respectively n phases, for each of the (e.g., n=3) phases. In this case, both the current signals $Ii(t)$ and the voltage signals $Ui(t)$ may be used for the approach to be described in the text which follows. Purely by way of example, use of the current signals $Ii(t)$ is assumed for explaining the procedure. It should however be clear that alternatively and in the same way the voltage signals $Ui(t)$ may also be used. Because the process acts are identical in the case of the use of $Ui(t)$, the monitoring unit 400 and the procedure taking place there are only explained for the processing of the current signals $Ii(t)$, but not explicitly for the voltage signals $Ui(t)$.

Each of the measured current signals $Ii(t)$ may be first digitized by an A/D converter 401, so that the latter subsequently outputs corresponding time signals $IiD(t)$. Connected downstream of the A/D converter 401 is a filter 402, which processes the time signals $IiD(t)$ to the extent that once again an envelope $IiDH(t)$ and also the phase position $PIi$ are extracted for each phase i. For this purpose, the filter 402 may be formed as a Hilbert filter, in which the incoming time signal $I(t)$ is processed with the aid of a Hilbert transformation. Alternatively, the filter 402 may square the respectively incoming signal $IiD(t)$ and subsequently low-pass filter it. The time signals $IiDH(t)$ produced by the filter 402 and phase positions $PIi$, which may also be referred to as "evaluation variables", are subsequently fed to an evaluation circuit 410, which includes an amplitude branch 410A with an optional further frequency filter 413 and an amplitude computing unit 414, a phase branch 410P with a phase computing unit 416 and also an evaluation unit 415.

In the amplitude branch 410A, the then applicable envelopes $IiDH(t)$, as before for i=1, ..., n, with n=3, are then optionally first limited with the aid of the frequency filter 413 to the speed range of the machine 100, e.g., those components of the frequency spectra of the signals $IiDH(t)$ that do not match the momentary speed band or range of the machine 100 are filtered out and removed. This is based on the consideration that the sinusoidal signals $IiDH(t)$ change their respective frequency in a way corresponding to the current rotational speed. Signal components with frequencies deviating from this may be understood as disturbance signals or as noise. These signal components may therefore be removed by the filter 413, for example in that the frequency filter 413 is formed as a bandpass filter. For example, the mid-frequency of the bandpass filter 413 may correspond to the momentary frequency of the machine 100.

Finally, filtered signals $IiDH'(t)$ may be removed at the output of the frequency filter 413, fed to the amplitude computing unit 414 as evaluation variables and compared there with one another. In a respective comparison, an associated relationship of the evaluation variables respectively to be compared is determined, the term "relationship" expressly including not only a quotient of the evaluation variables to be compared but also, for example, as an alternative to this, the corresponding difference between the evaluation variables to be compared. In the embodiment described here, the amplitude computing unit 414 may determine the differences of the current-signal envelopes $IiDH'(t)$, e.g., the differences of the amplitudes, as results of the comparison, e.g., $\Delta Ia = I1DH'(t) - I2DH'(t)$, $\Delta Ib = I2DH'(t) - I3DH'(t)$, and $\Delta Ic = I3DH'(t) - I1DH'(t)$.

The results of the comparison or amplitude differences $\Delta Ia$, $\Delta Ib$, $\Delta Ic$ are finally fed to the evaluation unit 415 and evaluated there. In the normal case, e.g., when there is no fault, it may be assumed that the n=3 differences $\Delta Ij$, with j=a,b,c, lie within a first tolerance range $dTI1$ around an expectation value $EWI \geq 0$, (e.g., $|\Delta Ij| - EWI \leq dTI1$, with $dTI1 \geq 0$ for all j), where in one case $EWI=0$ may apply. As long as this normal case applies, or as long as $|\Delta Ij| - EWI \leq dTI1$, the evaluation unit 415 communicates a corresponding control signal $KS=KS1$, for example, to the control system 500 of the drive system 1, and the electrical system 1 would be put into the normal operating state and kept there. The fixing of the operating state may take place by the control unit 500 and has an effect inter alia on the way in which the power electronics system 200 operates.

In the event that at least one of the n=3 differences $\Delta Ij$, with j=a,b,c, lies outside the first tolerance range $dTI1$ around the expectation value $EWI$, but still within a second tolerance range $dTI2 > dTI1$ around the expectation value $EWI$, (e.g., $dTI1 < |\Delta Ij| - EWI \leq dTI2$ for at least one of j=a,b,c), a closed-loop control of the system 1 is necessary. The aim of the closed-loop control is to provide that, for each of the differences $\Delta Ij$, it is again the case that $|\Delta Ij| - EWI \leq dTI1$, that is to say that the normal case is restored. Consequently, in the case of $dTI1 < |\Delta Ij| - EWI \leq dTI2$ for at least one of j=a,b,c, the evaluation unit 415 would communicate a corresponding control signal $KS=KS2$, (e.g., to the control system 500 of the drive system 1), and the electrical system 1 would be put into the warning operating state.

In the event that at least one of the n=3 differences $\Delta Ij$, with j=a,b,c, lies outside the second tolerance range $dTI2$ around the expectation value $EWI$, (e.g., $|\Delta Ij| - EWI > dTI2$ for at least one of j=a,b,c), it is assumed that there is such a serious fault in at least one of the winding systems 121-1, 121-2, 121-3 that even a closed-loop control of the system 1 does not promise to be successful. Such a great deviation or difference in the amplitudes means in effect an asymmetry of the n=3 winding systems 121-1, 121-2, 121-3 in the machine 100. With such a serious fault, the evaluation unit 415 would communicate a corresponding alarm signal $KS=KS3$, (e.g., to the control system 500 of the drive system 1), and the electrical system 1 would be put into the alarm operating state.

The further parameters that may be taken from the filter 402 are, as explained above, the phase positions $PIi$ of the current signals $IiD(t)$, likewise as before applicable to i=1, ..., n, with n=3. In addition or as an alternative to the evaluation described above of the envelopes $IiDH(t)$ of the current signals $IiD(t)$, these phase positions are fed as evaluation variables to the phase computing unit 416 of the phase branch 410P and compared there with one another. For example, the phase computing unit 416 may determine as results of the comparison the phase differences of the phase positions PIi of the current signals IiD(t), e.g., $\Delta$PIa=PI1−PI2, $\Delta$PIb=PI2−PI3, and $\Delta$PIc=PI3−PI1.

In a way similar to in the case described above of the amplitude differences $\Delta$Ia, $\Delta$Ib, $\Delta$Ic, also or alternatively the phase differences $\Delta$PIa, $\Delta$PIb, $\Delta$PIc are fed to the evaluation unit 415 and evaluated there.

In the normal case, (e.g., when there is no fault), it may be assumed that the n=3 differences $\Delta$PIj, with j=a,b,c, lie within a first tolerance range dTP1 around an expectation value EWP≥0, e.g., |$\Delta$PIj|−EWP≤dTP1, with dTP1≥0 for all j. Here, in one case EWP=360°/n applies, where in the case presented here n=3 applies. As long as this normal case applies, or as long as |$\Delta$PIj|−EWP≤dTP1, the evaluation unit 415 communicates a corresponding control signal KS=KS1 (e.g., to the control system 500 of the drive system 1), and the electrical system 1 would be put into the normal operating state corresponding to the control signal and kept there.

In the event that at least one of the n=3 differences $\Delta$PIj, with j=a,b,c, lies outside the first tolerance range dTP1 around the expectation value EWP, but still within a second tolerance range dTP2>dTP1 around the expectation value EWP, (e.g., dTP1<|$\Delta$PIj|−EWP≤dTP2 for at least one of j=a,b,c), a closed-loop control of the system 1 is necessary. The aim of the closed-loop control is to provide that, for each of the differences $\Delta$PIj, it is again the case that |APIj|−EWP≤dT1, that is to say that the normal case is restored. Consequently, in the case of dTP1<|$\Delta$PIj|−EWP≤dTP2 for at least one of j=a,b,c, the evaluation unit 415 would communicate a corresponding control signal KS=KS2 (e.g., to the control system 500 of the drive system 1), and the electrical system 1 would be put into the warning operating state.

In the event that at least one of the n=3 differences $\Delta$PIj, with j=a,b,c, lies outside the second tolerance range dTP2 around the expectation value EWP, (e.g., |$\Delta$PIj|−EWP>dTP2 for at least one of j=a,b,c), it is assumed that there is such a serious fault in at least one of the winding systems 121-1, 121-2, 121-3 that even a closed-loop control of the system 1 does not promise to be successful. Such a great difference in the phase positions PIi means in effect an asymmetry in the machine phases, for example caused by a part-coil rupture, damage to the insulation or similar defects. With such a serious fault, the evaluation unit 415 would communicate a corresponding alarm signal KS=KS3 (e.g., to the control system 500 of the drive system 1), and the electrical system 1 would be put into the alarm operating state.

The choice of the various tolerance ranges dTI, dTP has of course a direct influence on the degree of operational reliability of the system 1. The narrower or smaller the tolerance ranges are, the earlier they are possibly exceeded, so that the respective warning or alarm operating state potentially occurs earlier. Accordingly, the operational reliability increases with smaller tolerance ranges, but the risk of a false alarm is also greater. In the event that the envelopes or amplitudes are evaluated, it may purely by way of example be the case that the first tolerance range dTI1 lies at 2% with respect to the maxima of the envelopes, whereas dTI2 is correspondingly fixed at 5%. As mentioned, this choice is however greatly dependent on the application, so that the values indicated may be understood as given purely by way of example.

In the event that the monitoring unit 400 uses both the amplitude branch 410A and the phase branch 410P, and accordingly both branches 410A, 410P deliver the described differences, the evaluation unit 415 is designed in such a way that it establishes the control signal KS on the basis of a specified list of priorities, wherein the alarm operating state is allocated the highest priority and the normal operating state is allocated the lowest priority. If the differences $\Delta$Ij, $\Delta$PIj, with j=a,b,c, determined in the two branches 410A and 410P lie in difference tolerance ranges, and the two branches 410A and 410P would accordingly produce different individual control signals, the control signal KS to be transmitted to the control system 500 is fixed on the basis of the list of priorities in such a way that the control signal with the higher priority is selected.

It is of course also conceivable that, instead of the common evaluation unit 415 described, separate evaluation units are provided for the amplitude branch 410A and for the phase branch 410P of the monitoring unit 400, and if this were the case would communicate a respective control signal KSA for the amplitude branch 410A and KSP for the phase branch 410P to the control system 500. Also in this setup, the control system 500 operates on the basis of the list of priorities introduced above.

The control system 500 is also designed to control the electrical system 1 in an open-loop or closed-loop manner in dependence on the incoming control signal KS or the operating state indicated as a result.

In the event that the control signal KS indicates the normal operating state, no special measures are provided and the electrical system 1 is operated unchanged, for example, in dependence on specifications provided by the operator of the system 1. Closed-loop and open-loop control of the system 1 also take place in the normal operating state, once again in dependence on specifications provided by the operator of the system 1.

In the event that the control signal KS indicates the warning operating state, the control system 500 operates in such a way that the deviation from the specified mathematical relationship, e.g., from the respective expectation value EWI or EWP, is detected as described, while taking into account the respective tolerance dTI1 or dTP1, and suitable measures for correction are taken. For this purpose, the control system 500 operates or controls the electrical system 1 in such a way that the determined deviation(s) or difference(s) $\Delta$Ij or $\Delta$PIj that lie in the respective second tolerance range dTI2 or dTP2 are reduced to the extent that they go into the first tolerance range dTI1 or dTP1. The control system 500 may possibly report the presence of the warning operating state to the operator of the electrical system 1 by way of an optical, acoustic, or some other indicator 510, so that the operator may manually initiate or perform the necessary measures or else activate a correspondingly formed automatic system. Advantageously, in the warning operating state it is signaled to the operator of the system 1 that, at least momentarily, the full power of the system 1 is not requested, because otherwise, if the maximum power were requested, there would be the risk of currents that may lead to overheating flowing in one or more of the winding systems 121-1, 121-2, 121-3. The maximum power would however be available again as soon as the system 1 returns to the normal operating state.

In the event that the control signal KS indicates the alarm operating state, it is assumed that there is a serious fault, which makes it necessary to deactivate the system 1, or at least parts of it. In this case, the control system 500 may once again activate an optical, acoustic, or some other indicator 510 for the operator of the electrical system 1, so that the latter may initiate the necessary measure and/or in addition is informed that, as already mentioned above, the maximum possible power is not requested. Alternatively, or additionally, the control system 500 may be configured to deactivate or the like the system 1 or advantageously only parts of the system 1, such as the machine 100 or, e.g., only the winding system 121-1, 121-2, 121-3 of the stator winding system 121 that is affected by the fault.

In the warning operating state and in the alarm operating state, it is of interest to identify the faulty winding system 121-1, 121-2, 121-3, in order then to perform the closed-loop control of the system 1, and in particular of the power electronics system 200, accordingly. In order to achieve this, depending on need or availability, the amplitude differences ΔIa, ΔIb, ΔIc and/or the phase differences ΔPIa, ΔPIb, ΔPIc may be used. If there are, for example, three winding systems 121-1, 121-2, 121-3, and the first winding system 121-1 is defective or has a defective part-coil 121', this would have an influence on I1($t$), and consequently also on I1D(t), I1DH(t) and I1DH'(t), whereas I2($t$) and I3($t$) would be uninfluenced and meet expectations. For example, I1DH'(t)=0 and I2DH'(t)=I3DH'(t)>0 would then apply. Consequently, only ΔIb=I2DH'(t)−I3DH'(t)<dTI1 would apply, whereas for example |ΔIa|−EWI>dTI2 and also |ΔIc|−EWI>dTI2 would be likely for the alarm operating state. It may easily be deduced from this that in this case, given by way of example, I1($t$) does not meet expectations, and therefore that the winding system 121-1 is defective. The same applies correspondingly if not the amplitude differences but the phase differences are used.

It is sufficient in principle for the detection of a fault to monitor either the amplitude differences ΔI or the phase differences ΔPI, e.g., both parameters do not necessarily have to be considered. The amplitude differences may be considered because they may be less affected by noise, and consequently more reliable. For this reason, the threshold values dTI1, dTI2 may also be fixed better.

Optionally, the activity of the evaluation circuit 410 or of one or more of the components 413, 414, 416, and/or 415 connected downstream of the filter 402 may be dependent on the respectively momentary amplitude of one or more of the envelopes IiDH(t). In the event that this option is to be used, the envelope I1DH(t) determined by the filter 402 may be considered as a criterion for activity or inactivity. Only if, or as long as, the maximum amplitudes of these envelopes I1DH(t) exceed a threshold value SWAkt are the evaluation circuit 410 or the stated components 413, 414, 416, and/or 415 active and perform the activities described above. If, however, for example I1DH(t)<SWAkt applies, the evaluation circuit 410 would be deactivated, in that, for example, the amplitude branch 410A and the phase branch 410P are deactivated. Alternatively, it may be that only the evaluation unit 415 is deactivated.

In this connection, the term "deactivated" for the evaluation circuit 410 may mean that the filter 402 does not output a signal IiDH(t) or possibly PIi in the first place to the evaluation circuit 410 or to the amplitude branch 413, 414, and/or to the phase branch 416. The term "deactivated" is also intended to include that mode in which the components of the amplitude branch 413, 414, or of the phase branch 416 are switched off and do not process possible input signals from the filter 402. Furthermore, the term "deactivated" may also mean that the evaluation unit 415 does not process possible input signals from the amplitude branch 410A and/or the phase branch 410P, that the evaluation unit 415 does process or evaluate possible input signals, but then, irrespective of the momentary results of the evaluation, does not output a control signal KS, and/or that the evaluation unit 415 is switched off entirely. For all of the options of the "deactivated" evaluation circuit 410, it is the case however that no control signal KS is fed to the control system 500.

The control system 500 may then operate the electrical system 1, for example, in the normal operating state.

The advantage thereby obtained lies substantially in the fact that it may be assumed on the basis of the high signal strength IiDH(t), in comparison with the noise, obtained with I1DH(t)>SWAkt that the considerations undertaken in the amplitude branch 410A and in the phase branch 410P may be undertaken with sufficiently great reliability that the risk of false alarms may be reduced. As an alternative to the consideration of the envelopes I1DH(t) cited by way of example, of course each of the envelopes IiDH(t) may be considered. It would also be conceivable, for example, to consider the mean value or the sum of the amounts of the envelopes IiDH(t) and to compare this mean value with a corresponding threshold value SWAkt. Only if for example Σ(|IiDH(t)|)>SWAkt applies are the otherwise deactivated components 413, 414, 416, and/or 415 activated. Other parameters and threshold values are of course likewise conceivable.

In the event that the filter 402 operates as a Hilbert filter, the Hilbert filter requires a pass-through time of h cycles in order to be able on the basis of an input signal IiD(t) to deliver a filtered signal IiDH(t). This consequently means a corresponding delay in the detection of the fault. This number of cycles h or the corresponding frequency FH is measured against the frequency FL of the power electronics system 200. The power electronics system 200 operates, for example, with 10 kHz and generates in the motor operating mode the current/voltage signal I(t) or U(t) for activation of the machine 100. The monitoring unit 400 may operate at least with the frequency of the power electronics system 200, and thus monitors the currents I(t) and/or voltages U(t) virtually in real time. In effect, the time delay between a fault and detection is defined by the signal processing time in the monitoring unit 400, and there in particular in the filters 402 and possibly 413.

The disclosure has been described for the special application, though only given by way of example, of an electric drive 1 for an aerial vehicle. In more general terms, the fault-susceptible electric machine 100 of which the operation is monitored may be an electric motor in a safety-critical electric drive system, which is installed, for example, in an aerial vehicle (such as an aircraft, a helicopter, or a drone), in a rail vehicle, or in a water vehicle for the drive thereof. The monitoring is aimed in particular at the operational monitoring of the wire coils or stator windings in the respective motor, sensing, for example, coil ruptures or damage to the insulation. As a departure from the form in FIG. 1 as a rotary machine, the motor 100 may be formed as a linear motor, which may be used in a hyperloop, in various transport systems, and also in propulsion drives. Furthermore, the described approach may likewise be used when the electric machine 100 is not operated as a motor but as a generator.

Figure 5:
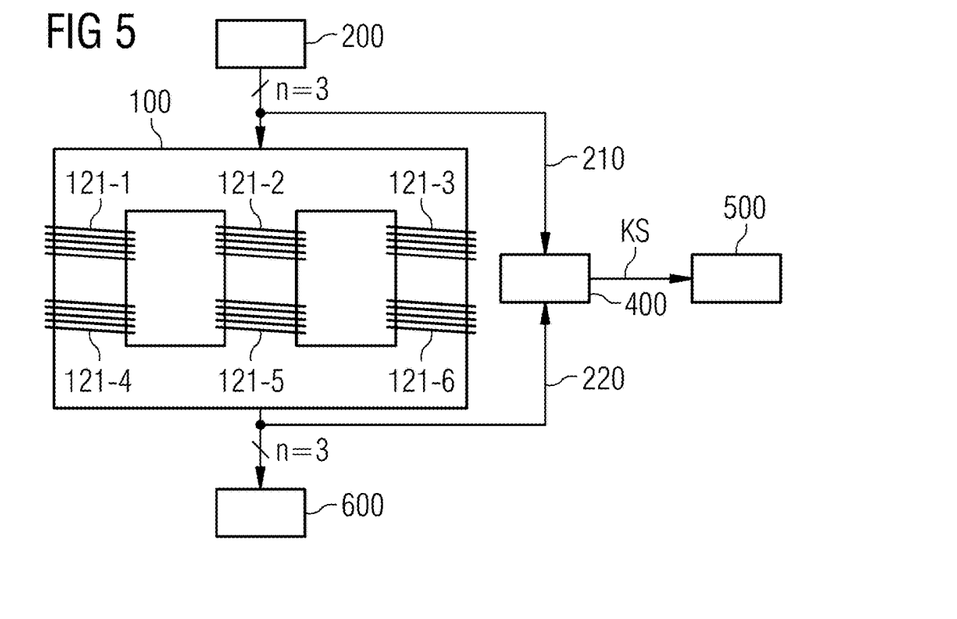
FIG. 5 shows an application in the example of a transformer.

The approach may not only be suitable for this application but also, e.g., for tasks in which a time-variable amplitude, frequency, and phase that are in a coordinated relationship are monitored. Mention should also be made here, for example, of the embodiment of the electric machine 100 as a transformer, which is sketched as a basic representation in FIG. 5. For the sake of clarity, the representation of the electrical energy source, etc. has been omitted in FIG. 5. The transformer 100, operating in a known way, includes a plurality of primary coils 121-1, 121-2, 121-3, into which the currents to be transformed are fed from a current source 200 by way of an electrical connection 210. In secondary coils 121-4, 121-5, 121-6, currents are induced in a known way and may be fed to an electrical consumer 600 by way of an electrical connection 220. The currents flowing through the primary coils 121-1, 121-2, 121-3 and/or the currents flowing through the secondary coils 121-4, 121-5, 121-6, or the voltages present in each case, may be respectively monitored as described above by a monitoring unit 400, the currents in the primary coils 121-1, 121-2, 121-3 and/or their phases again being compared with one another. Alternatively, or additionally, the currents in the secondary coils 121-4, 121-5, 121-6 and/or their phases may be compared with one another. In the situations described, potentially the normal operating state, the warning operating state, or the alarm operating state may then be established.

Although the disclosure has been illustrated and described in greater detail by the exemplary embodiments, the disclosure is not restricted by these exemplary embodiments. Other variations may be derived herefrom by the person skilled in the art, without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for operating an electric machine of an electrical system in dependence on an operating state of the electrical system, the method comprising:
   determining, during the operation of the electric machine, at least one group of evaluation variables for a multiphase time signal that is transmitted momentarily from or to the electric machine in such a way that in each case an evaluation variable of the group of evaluation variables is determined for at least two different phases of the multiphase time signal;
   comparing, in an evaluation circuit, each of the determined evaluation variables of the respective group of evaluation variables with every other of the determined evaluation variables of the respective group; and
   establishing the operating state of the electrical system based on the comparison,
   wherein the operating state is a normal operating state, a warning operating state, or an alarm operating state,
   wherein the electrical system is operated in the normal operating state when all results of the comparison lie within a first tolerance range around an expectation value,
   wherein the electrical system is operated in the warning operating state when at least one result of the comparison lies within a second tolerance range around the expectation value,
   wherein the second tolerance range is wider than the first tolerance range, and
   wherein, in the warning operating state of the electrical system, a closed-loop control of the electrical system is prompted such that the result of the comparison is changed on account of the closed-loop control to an extent that the result of the comparison goes from the second tolerance range into the first tolerance range.

2. The method of claim 1,
   wherein the electrical system is operated in the alarm operating state when at least one result of the comparison lies within a third tolerance range around the expectation value,
   wherein the third tolerance range is wider than the second tolerance range,
   wherein the first tolerance range, the second tolerance range, and the third tolerance range do not overlap, and
   wherein a fault is inferred in the alarm operating state of the electrical system, a fault is inferred, and the electric machine, the electrical system, or a component of the electrical system in which the fault is present is deactivated in the alarm operating state.

3. The method of claim 1, wherein envelopes of the different phases of the multiphase time signal are used as evaluation variables in one group of evaluation variables of the groups of evaluation variables.

4. The method of claim 3, wherein, for the group of evaluation variables, the expectation value equals zero when the results of the comparison are determined by forming a difference, and the expectation value equals 1 when the results of the comparison are determined by forming a quotient.

5. The method of claim 3, wherein the evaluation circuit is deactivated when a specific parameter based on at least one of the envelopes determined lies below a specified threshold value.

6. The method of claim 1, wherein phase positions of the different phases of the multiphase time signal are used as evaluation variables in one group of evaluation variables of the groups of evaluation variables.

7. The method of claim 6, wherein, for the group of evaluation variables, the expectation value equals 360°/n when the results of the comparison are determined by forming a difference, where n indicates a number of phases, and the expectation value equals 1 when the results of the comparison are determined by forming a quotient.

8. A method for operating an electric machine of an electrical system in dependence on an operating state of the electrical system, the method comprising:
   determining, during the operation of the electric machine, at least one group of evaluation variables for a multiphase time signal that is transmitted momentarily from or to the electric machine in such a way that in each case an evaluation variable of the group of evaluation variables is determined for at least two different phases of the multiphase time signal;
   comparing, in an evaluation circuit, each of the determined evaluation variables of the respective group of evaluation variables with every other of the determined evaluation variables of the respective group; and
   establishing the operating state of the electrical system based on the comparison,
   wherein the operating state is a normal operating state, a warning operating state, or an alarm operating state, and
   wherein, for each phase of the multiphase time signal, a Hilbert filter is applied to the respective phase of the multiphase time signal to determine the respective evaluation variable.

9. A method for operating an electric machine of an electrical system in dependence on an operating state of the electrical system, the method comprising:

determining, during the operation of the electric machine, at least one group of evaluation variables for a multiphase time signal that is transmitted momentarily from or to the electric machine in such a way that in each case an evaluation variable of the group of evaluation variables is determined for at least two different phases of the multiphase time signal;

comparing, in an evaluation circuit, each of the determined evaluation variables of the respective group of evaluation variables with every other of the determined evaluation variables of the respective group; and establishing the operating state of the electrical system based on the comparison, wherein the operating state is a normal operating state, a warning operating state, or an alarm operating state, wherein the operating state is a normal operating state, a warning operating state, or an alarm operating state, and wherein, in the comparison of the evaluation variables of the different phases of the multiphase time signal with one another, the respective result of the comparison for a respective group is determined by forming a difference or by forming a quotient of two evaluation variables of the respective group that are in each case to be compared.

10. A monitoring unit comprising:
an electrical interface for connecting the monitoring unit to an electrical line, which carries a multiphase time signal transmitted momentarily from or to an electric machine of an electric system;
a filter for determining evaluation variables, which is configured to be connected to the electrical line by way of the electrical interface; and
an evaluation circuit connected to the filter, wherein the evaluation variables determined by the filter are configured to be fed to the evaluation circuit,
wherein the filter is configured to determine, during operation of the electric machine, at least one group of evaluation variables for the multiphase time signal that is transmitted momentarily from or to the electric machine and is fed to the filter by way of the electrical interface, in such a way that in each case one evaluation variable of the group of evaluation variables is determined for at least two different phases of the multiphase time signal, and
wherein the evaluation circuit is configured to compare each of the determined evaluation variables of the respective group of evaluation variables with every other of the determined evaluation variables of the respective group of evaluation variables and, in dependence on a respective result of the comparison, to produce a control signal, which serves as a basis for establishing an operating state of the electrical system.

11. The monitoring unit of claim 10, wherein the filter is a Hilbert filter.

12. The monitoring unit of claim 10, wherein envelopes of the different phases of the multiphase time signal are used as evaluation variables in one group of evaluation variables of the groups of evaluation variables,
wherein the evaluation circuit comprises an amplitude branch with an amplitude computing unit, to which the envelopes are fed as a group of evaluation variables, and
wherein the evaluation circuit is configured to determine, in the comparison of the evaluation variables of the group of evaluation variables with one another, a respective difference between or a quotient of two evaluation variables of the group that are to be compared.

13. The monitoring unit of claim 10, wherein phase positions of the different phases of the multiphase time signal are used as evaluation variables in one group of evaluation variables of the groups of evaluation variables,
wherein the evaluation circuit comprises a phase branch with a phase computing unit, to which the phase positions are fed as a group of evaluation variables, and
wherein the evaluation circuit is configured to determine, in the comparison of the evaluation variables of the group of evaluation variables with one another, a respective difference between or a quotient of two evaluation variables of the group that are to be compared.

14. The monitoring unit of claim 10, wherein the evaluation circuit comprises an evaluation unit, to which the results of the comparison determined in a respective computing unit are fed,
wherein the evaluation unit is configured to compare the results of the comparison with a respective specified expectation value, and
wherein the evaluation unit is configured to generate the control signal in dependence on deviations of the results of the comparison from the respective expectation value.

15. An electrical system comprising:
an electric machine; and
a monitoring unit comprising:
an electrical interface for connecting the monitoring unit to an electrical line, which carries a multiphase time signal transmitted momentarily from or to the electric machine;
a filter for determining evaluation variables, which is configured to be connected to the electrical line by way of the electrical interface; and
an evaluation circuit connected to the filter, wherein the evaluation variables determined by the filter are configured to be fed to the evaluation circuit,
wherein the filter is configured to determine, during operation of the electric machine, at least one group of evaluation variables for the multiphase time signal that is transmitted momentarily from or to the electric machine and is fed to the filter by way of the electrical interface, in such a way that in each case one evaluation variable of the group of evaluation variables is determined for at least two different phases of the multiphase time signal, and
wherein the evaluation circuit is configured to compare each of the determined evaluation variables of the respective group of evaluation variables with every other of the determined evaluation variables of the respective group of evaluation variables and, in dependence on a respective result of the comparison, to produce a control signal, which serves as a basis for establishing an operating state of the electrical system.

16. The electrical system of claim 15, wherein the electric machine is an electric motor, an electric generator, or a transformer.

* * * * *